UNITED STATES PATENT OFFICE.

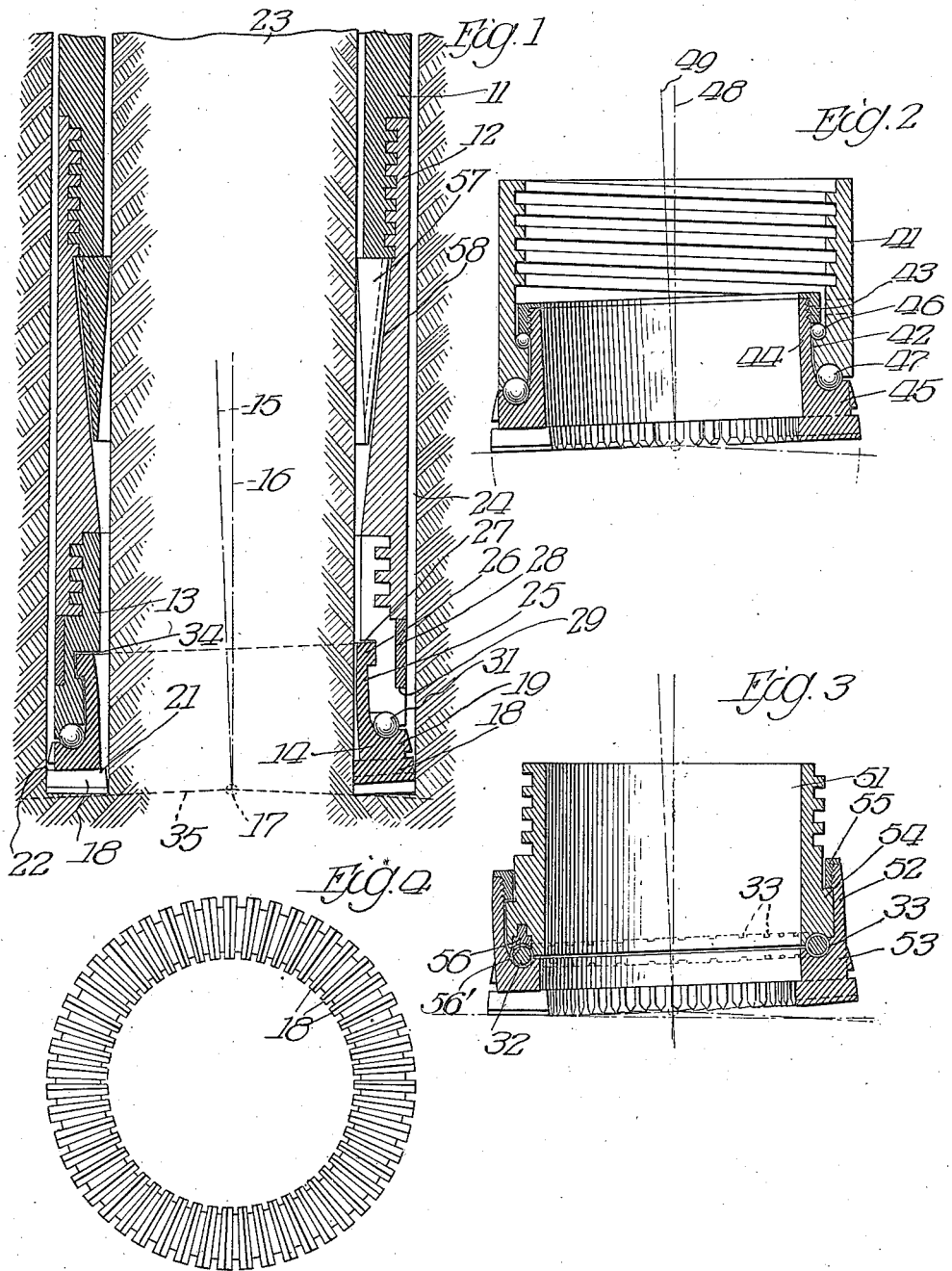

ROWLAND O. PICKIN, OF CHICAGO, ILLINOIS.

CORE-DRILL.

1,254,268.

Specification of Letters Patent.  Patented Jan. 22, 1918.

Application filed February 6, 1914.  Serial No. 816,881.

*To all whom it may concern:*

Be it known that I, ROWLAND O. PICKIN, a subject of the King of Great Britain, residing at Chicago, in the county of Cook and State of Illinois, have invented certain new and useful Improvements in Core-Drills, of which the following is a specification.

My present invention relates in general to boring drills and more particularly to devices of this character adapted to bore an annular hole in rock, hard earth and the like, leaving a core extending centrally of the annular hole which may be bodily removed after the hole is bored or in sections as the hole is deepened.

The invention has for its aim broadly to provide a novel and improved cutting tool for drills of this character of simple and economic construction and of durable and accurate operation.

It is a principal object of the invention to provide a cutting tool for a drill of this character adapted to cut, crush and loosen the rock or other material by a crushing and pulverizing action, the tool being so constructed and mounted in the drill shaft that the pulverizing and crushing force will be concentrated throughout a relatively small and constantly shifting portion of the face of the tool.

It is a further object of my invention to provide a cutting tool which may be used to replace the expensive tool of the diamond drill and which will be much cheaper to construct and repair, and substantially as durable and efficient in operation.

Other objects and advantages of the invention will be apparent as it is better understood from the following description when considered in connection with the accompanying drawing, illustrating various embodiments of my invention.

On the drawings,

Figure 1 is a longitudinal sectional view of a core drill embodying my invention;

Fig. 2 is a similar view showing a somewhat modified form of a drill head and cutter;

Fig. 3 is a similar view showing certain other modifications, and

Fig. 4 is a bottom plan of a preferred form of cutting face.

Referring to the drawings and more particularly to Fig. 1, reference character 11 designates a tube or hollow shaft which receives power from a suitable source (not shown) to operate the core drill. To this a sleeve 12 is threaded or otherwise secured and this sleeve carries at its lower end a drill head 13 in which is mounted a cutting tool or cutter 14. The drill head, sleeve and shaft 11 are all rigidly fastened together when the parts are assembled and in use and these parts rotate continuously as one member. The cutting tool 14 is mounted in the drill head so that its axis, indicated by the dotted line 15, is inclined to the longitudinal axis, indicated by dotted line 16, of the drill head, sleeve and shaft. As the shaft is turned the cutting tool receives a gyratory movement about the point 17 located at the intersection of the two axes 15 and 16.

In the embodiment shown in Fig. 1 the cutting tool is provided with a plurality of cutting teeth 18 preferably of wedge-like form. These teeth are arranged radially and extend downwardly from the body portion 19 of the cutter. The teeth are wider than this body portion and extend inwardly of the body portion, as at 21, and outwardly of the body portion, as at 22, of the cutting tool so that the teeth cut an annular hole as the tool moves under the influence of the shaft 11 of width wider than the body portion of the tool and of the drill head sleeve and shaft. This permits water to be forced downwardly alongside the core 23, the surface of which is determined by the inwardly projecting portions 21 of the teeth, and out between the teeth and up between the face of the shaft 11 and the outer surface 24 of the hole. Extending upwardly from the body portion is an annular projection 25, at the upper end of which is an outwardly extending flange or shoulder 26. This shoulder rests in a suitable groove 27 provided in the drill head, the material beneath this groove providing a shoulder against which the shoulder 26 bears in action. In order that the flange may engage in this groove the drill head is split longitudinally at one side, so that the drill head may be extended to permit the flange or shoulder 26 to enter the groove 27. In order that the drill head may be maintained in contracted relation during use a ring or band 28 fits down opposite the recess 27 and against a shoulder 29, this ring being held in place by the lower end of the sleeve 12 when the parts are assembled.

Between the lower end of the drill head and the adjacent face of the body portion of the cutter are preferably provided anti-friction devices 31 which may consist in any of the embodiments of the invention shown on the drawing of the balls shown in Fig. 1 or single ring 32 of the form shown in Fig. 3. This ring consists of a single metallic member grooved at intervals, as indicated at 33. Where the last mentioned anti-friction device is employed the relative movement between the drill head and cutter causes the ring to move relatively to the adjacent surfaces and the notches 33 gather in any sand, dirt or other material which, if permitted to play between the surfaces, would greatly increase the friction and greatly shorten the life of the parts. The cutter fits loosely in the drill head in order that the water forced down between the drill head and core may enter around the anti-friction devices to prevent in large degree dust and dirt from accumulating around the anti-friction devices and to remove it as it enters. In practice the water flowing about the anti-friction devices enters the space 34 between the upper surface of the shoulder 26 and the adjacent face of the groove 27, passes behind the shoulder 26 and down between the adjacent faces of the upwardly extending projection 25 of the cutter and the lower portion of the drill head.

Although the cutting teeth and, indeed, the cutter itself may have any desired shape, I believe it advantageous to have all portions of the cutter operating on or above a normal to the axis of the cutter taken through the intersection of the axes of the cutter and shaft 11. This normal is indicated in Fig. 1 at 35 and it is also thought desirable that at least one cutting point touch continuously this normal in order that the drill may be held to a true course and prevented from wabbling and vibrating.

The cutting tool provided in Fig. 1 is adapted to cut an annular hole having a lower face disposed at right angles to the axis of the core. It will be noted that the inner edge at the cutting side (left in the figure) contacts with the normal 35 at right angles to the axis of the cutter. The cutting edges of the portions 21 and 22 are preferably curved to the zones of a sphere having radii equal to the distance from these zones to the center of gyration of the cutting tool in order that these edges may lift from contact with the surfaces being cut to the position shown at the right of the figure as the shaft 11 rotates.

In Fig. 2 a different means of mounting the cutting tool in a drill head is disclosed. In this embodiment of the invention the drill head consists of a single, solid, rigid member 41 provided adjacent its bottom with an inwardly extending annular shoulder 42 above which engages an outwardly extending shoulder 43 which supports the cutter. This shoulder in the present instance consists of a ring threaded to the upwardly extending portion 44 of the body portion 45 of the cutting tool. The diameter of the ring 43 is slightly less than the internal diameter of the drill head 41 so that it may be removed upwardly through the drill head when disengaged from the cutting tool. In this device two sets of anti-friction devices are provided, one between the shoulders 43 and 42 and the other between the bearing faces of the cutter and drill head. The lower faces of the cutting teeth in the cutting tool shown in this figure fall in a single plane disposed at right angles to the longitudinal axis 49 and passing through the intersection of the axes 48 and 49 of the drill head and cutting tool, respectively. In other important respects the tool is identical with that shown in Fig. 1 and detailed description thereof is not thought to be necessary.

In Fig. 3 an embodiment of the device is shown in which the drill head 51 is disposed within the upwardly extending annular projection 52 of the cutting tool 53. Adjacent its bottom the drill head is provided with an outwardly extending shoulder 54 upon which rests a ring 55 threadedly connected with the upper edge of the upwardly extending projection 52. The cutting teeth and remaining portions of this tool are similar to those already described and detailed description of them will not be necessary except in this figure a plug 56 is provided to bear upon the anti-friction devices at the lower or working side of the drill head. As the drill head turns, this plug is always in contact with the anti-friction devices at the point where the force applied to the cutting tool is received and, of course, may be provided with equal results in the other embodiments just described. This plug is removable and when worn can be replaced without requiring the provision of a new drill head. When the anti-friction device of the form shown in this figure is provided the plug may be provided with projections 56' adapted to engage in the grooves 33 of the anti-friction device so that the anti-friction device will be held against rotation relatively to the drill head, concentrating the wear upon the adjacent faces of the anti-friction device and the cutting tool. The cutting tool of necessity must be replaced at intervals as the teeth wear away and this provision will prevent any wear of the drill head and consequently any need of replacing it during the use of the tool.

In order that the core may be readily removed, I provide a split ring 57 (Fig. 1) of well-known type which normally rides beneath the lower end of the shaft 11 in contact with the core 23. As the tool deepens the hole this sleeve is forced downwardly by the end of the shaft and upon return movement of the drill lifts the portion of the core above it by reason of its engagement with the sleeve 12. The adjacent faces 58 of the sleeve 12 and the ring 57 are parallelly inclined, so that upward movement of the shaft causes the ring to be contracted by the pressure exerted downwardly on the ring by the core, the contraction of the ring thus resulting forcing it against the core so that it grips the core and lifts it out of the hole.

It will be obvious from the foregoing that a tool embodying my invention may be provided economically and by reason of the peculiar and novel construction will be durable and efficient in operation and may be readily replaced or repaired as occasion may demand.

It is thought that the invention and many of its attendant advantages will be understood from the foregoing without further description and it will be apparent that various changes may be made in the form, construction and arrangement of the parts without departing from the spirit and scope of the invention, the forms hereinbefore disclosed being merely preferred embodiments thereof.

I claim:

1. In a core drill, the combination of a cutter having its axis inclined to the vertical, and means for imparting a gyratory movement to said cutter about a center of gyration at the intersection of the axis of said cutter and a line normal thereto and passing through the lowest cutting point of said cutter.

2. In a core drill, the combination of a cutter having its axis inclined to the vertical, and means for imparting a gyratory movement to said cutter about a center of gyration located at the intersection of the axis of said cutter and a line normal to said axis taken through the lowermost point of cut of the cutter, said intersection lying on the axis of said means.

3. In a core drill, the combination of an annular cutter having cutting teeth formed on its inner and outer cylindrical faces, the cutting edges of said outer teeth being disposed in a zone of a sphere of radii equal to the distance between these edges and the axis of said cutter.

4. In a core drill, the combination of an operating member, an annular cutter carried thereby with its axis disposed angularly with respect to the axis of said operating member and provided with cutting teeth at its base, said teeth being extended beneath and from the inner and outer sides of the body portion of said cutter.

5. In a core drill, the combination of an operating member, and an annular cutter having its axis disposed angularly with respect to the axis of said member and provided with a plurality of cutting teeth extending downwardly from the body portion of said cutter and of greater transverse width than the width of said cutter.

6. In a core drill, the combination of an operating member, and an annular cutter angularly disposed with respect to said operating member, said annular cutter being provided with downwardly extending teeth, each of said teeth extending inwardly and outwardly of the body portion of said cutter.

7. In a core drill, the combination of an operating member, an annular cutter carried thereby and having its axis disposed angularly with respect to the axis of said member, said cutter being provided with cutting teeth wider than said member and the body portion of said cutter to provide space on each side of said operating member and cutter to permit water to be forced down past the cutting face of said cutter.

8. In a core drill, the combination of a rotatable operating member, a cutter carried thereby with its axis disposed angularly with respect to the axis of said operating member, anti-friction devices interposed between the bearing surfaces of said cutter and member, and a removable member positioned to engage said antifriction devices to take the wear on said operating member.

9. In a drill, the combination of an operating member, a head engaging said operating member, and a cutter mounted in said head with its longitudinal axis disposed angularly with respect to the axis of said head, said cutter and head being provided with grooves and oppositely extending integral interlocking shoulders, seated in said grooves.

10. In a drill, the combination of an operating member, an expansible head engaging said operating member and provided with an internal annular groove, and a cutter disposed within said head and having an outwardly extending shoulder engaging in said groove, the connection between said head and operating member preventing expansion of the head when the parts are assembled.

11. In a drill, the combination of an operating member, a hollow head split longitudinally at one side and provided with an internal annular groove, and a cutting tool having an outwardly extending projection disposed in said groove, the engagement between said operating member and head preventing expansion of said head when the parts are assembled.

ROWLAND O. PICKIN.

Witnesses:
J. C. CARPENTER,
M. A. KIDDIE.